United States Patent
McGrath et al.

(10) Patent No.: US 8,684,092 B2
(45) Date of Patent: *Apr. 1, 2014

(54) SYSTEM AND METHOD FOR PROVIDING ADDITIONAL BLOWOUT PREVENTER CONTROL REDUNDANCY

(71) Applicant: Transocean Sedco Forex Ventures Limited, George Town Grand Cayman (KY)

(72) Inventors: Scott P. McGrath, Sugar Land, TX (US); Brian K. Williams, Cypress, TX (US)

(73) Assignee: Transocean Sedco Forex Ventures Limited, George Town Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 13/770,856

(22) Filed: Feb. 19, 2013

(65) Prior Publication Data
US 2013/0270465 A1   Oct. 17, 2013

Related U.S. Application Data

(63) Continuation of application No. 12/234,005, filed on Sep. 19, 2008, now Pat. No. 8,376,051.

(60) Provisional application No. 60/974,339, filed on Sep. 21, 2007.

(51) Int. Cl.
*E21B 33/06* (2006.01)

(52) U.S. Cl.
USPC ............. 166/368; 166/344; 166/347; 251/1.1

(58) Field of Classification Search
USPC ......... 166/368, 338, 344, 345, 347, 363, 364, 166/373, 86.1; 137/315.02; 251/1.1–1.3
See application file for complete search history.

(56) References Cited

U.S. PATENT DOCUMENTS

| | | | | |
|---|---|---|---|---|
| 1,610,372 A | * | 12/1926 | Hansen | 175/6 |
| 3,191,388 A | * | 6/1965 | Ludwig | 405/197 |
| 3,313,345 A | * | 4/1967 | Fischer | 166/355 |
| 3,380,520 A | * | 4/1968 | Pease | 166/352 |
| 3,434,550 A | * | 3/1969 | Townsend, Jr. | 175/5 |
| 3,865,142 A | * | 2/1975 | Begun et al. | 137/635 |
| 4,095,421 A | * | 6/1978 | Silcox | 60/398 |
| 4,170,266 A | * | 10/1979 | Fayren | 175/7 |
| 4,174,000 A | * | 11/1979 | Milberger | 166/363 |
| 4,176,722 A | * | 12/1979 | Wetmore et al. | 175/7 |
| 4,188,156 A | * | 2/1980 | Fisher et al. | 405/224.3 |
| 4,401,164 A | * | 8/1983 | Baugh | 166/379 |
| 4,556,340 A | * | 12/1985 | Morton | 405/224.2 |
| 4,880,025 A | * | 11/1989 | McMahan et al. | 137/1 |
| 5,070,904 A | * | 12/1991 | McMahon et al. | 137/560 |
| 5,456,313 A | * | 10/1995 | Hopper et al. | 166/97.1 |

(Continued)

*Primary Examiner* — Matthew Buck
(74) *Attorney, Agent, or Firm* — Fulbright & Jaworski LLP

(57) ABSTRACT

An apparatus to allow backup or alternate fluid flow routes around malfunctioning BOP control components using a remotely installed removable hydraulic hose connection. The backup fluid flow route sends pressure-regulated hydraulic fluid to a BOP operation via an isolation valve rigidly attached to the BOP, then to a hose connected to an intervention panel on the BOP and finally through a valve that isolates the primary flow route and establishes a secondary flow route to allow continued operation. To increase reliability, the backup components route from a spare BOP function and are rigidly fixed to the BOP.

9 Claims, 2 Drawing Sheets

(56) References Cited

U.S. PATENT DOCUMENTS

| | | | |
|---|---|---|---|
| 5,676,209 A * | 10/1997 | Reynolds | 166/345 |
| 6,032,742 A * | 3/2000 | Tomlin et al. | 166/345 |
| 6,047,781 A * | 4/2000 | Scott et al. | 175/5 |
| 6,068,427 A * | 5/2000 | Østergaard | 405/191 |
| 6,161,586 A * | 12/2000 | Hirata et al. | 137/884 |
| 6,161,618 A * | 12/2000 | Parks et al. | 166/351 |
| 6,192,680 B1 * | 2/2001 | Brugman et al. | 60/398 |
| 6,234,717 B1 * | 5/2001 | Corbetta | 405/170 |
| 6,257,268 B1 * | 7/2001 | Hope et al. | 137/112 |
| 6,422,315 B1 * | 7/2002 | Dean | 166/339 |
| 6,474,416 B2 * | 11/2002 | Beall et al. | 166/343 |
| 6,484,806 B2 * | 11/2002 | Childers et al. | 166/351 |
| 6,622,799 B2 * | 9/2003 | Dean | 166/381 |
| 6,640,901 B1 * | 11/2003 | Appleford et al. | 166/357 |
| 6,644,410 B1 * | 11/2003 | Lindsey-Curran et al. | 166/360 |
| 6,873,063 B1 * | 3/2005 | Appleford et al. | 307/149 |
| 7,222,674 B2 * | 5/2007 | Reynolds | 166/341 |
| 7,757,772 B2 * | 7/2010 | Donohue et al. | 166/344 |
| 8,376,051 B2 * | 2/2013 | McGrath et al. | 166/368 |
| 2003/0042025 A1 * | 3/2003 | Fenton et al. | 166/347 |
| 2004/0216884 A1 * | 11/2004 | Bodine et al. | 166/335 |
| 2005/0039923 A1 * | 2/2005 | Howe et al. | 166/368 |
| 2007/0107904 A1 * | 5/2007 | Donahue et al. | 166/345 |
| 2009/0095464 A1 * | 4/2009 | McGrath et al. | 166/53 |

* cited by examiner

SYSTEM AND METHOD FOR PROVIDING ADDITIONAL BLOWOUT PREVENTER CONTROL REDUNDANCY

CROSS-REFERENCE TO RELATED APPLICATIONS

This application is a continuation of U.S. application Ser. No. 12/234,055 filed Sep. 19, 2008 which claims priority to U.S. provisional application Ser. No. 60/974,339, filed Sep. 21, 2007.

TECHNICAL FIELD

The invention relates generally to a fluid supply system and apparatus and, more particularly, to a backup hydraulic fluid supply system and apparatus for BOPs.

BACKGROUND OF THE INVENTION

Subsea drilling operations may experience a blow out, which is an uncontrolled flow of formation fluids into the drilling well. Blow outs are dangerous and costly, and can cause loss of life, pollution, damage to drilling equipment, and loss of well production. To prevent blowouts, blowout prevention (BOP) equipment is required. BOP equipment typically includes a series of functions capable of safely isolating and controlling the formation pressures and fluids at the drilling site. BOP functions include opening and closing hydraulically operated pipe rams, annular seals, shear rams designed to cut the pipe, a series of remote operated valves to allow controlled flow of drilling fluids, and well re-entry equipment. In addition, process and condition monitoring devices complete the BOP system. The drilling industry refers to the BOP system in total as the BOP Stack.

The well and BOP connect to the surface drilling vessel through a marine riser pipe, which carries formation fluids (e.g., oil, etc.) to the surface and circulates drilling fluids. The marine riser pipe connects to the BOP through the Lower Marine Riser Package ("LMRP"), which contains a device to connect to the BOP, an annular seal for well control, and flow control devices to supply hydraulic fluids for the operation of the BOP. The LMRP and the BOP are commonly referred to collectively as simply the BOP, and as used herein and in the claims, the term BOP refers both to the BOP stack and the LMRP. Many BOP functions are hydraulically controlled, with piping attached to the riser supplying hydraulic fluids and other well control fluids. Typically, a central control unit allows an operator to monitor and control the BOP functions from the surface. The central control unit includes hydraulic control systems for controlling the various BOP functions, each of which has various flow control components upstream of it. An operator on the surface vessel typically operates the flow control components and the BOP functions via an electronic multiplex control system.

Certain drilling or environmental situations require an operator to disconnect the LMRP from the BOP and retrieve the riser and LMRP to the surface vessel. The BOP functions must contain the well when a LMRP is disconnected so that formation fluids do not escape into the environment. To increase the likelihood that a well will be contained in an upset or disconnect condition, companies typically include redundant systems designed to prevent loss of control if one control component fails. Usually, companies provide redundancy by installing two separate independent central control units to double all critical control units. The industry refers to the two central control units as a blue pod and a yellow pod. Only one pod is used at a time, with the other providing backup.

While prior art systems have dual redundancy, this redundancy is effectively only safety redundancy but not operational redundancy, meaning that a single component failure will require stopping drilling operations, making the well safe, and replacing the failed component. Stopping drilling to replace components often represents a major out of service period and significant revenue loss for drilling contractors and operators.

Further, when the BOP is at the surface, testing various functions typically requires breaking threaded connections to the BOP function. Making and breaking threaded connections allows opportunity for damage to the connection, requiring replacement and possible downtime.

The industry needs a simple, reliable, and cost effective method to provide added redundancy and prevent unplanned stack retrievals. The industry needs a simpler, economic, and effective method of controlling subsea well control equipment and testing and maintaining the equipment when it is on the surface.

BRIEF SUMMARY OF THE INVENTION

The present invention provides an improved method and apparatus to provide redundancy to fluid flow components via alternative flow routes. The present invention allows for safe and efficient bypass of faulty components while allowing continued flow to and control of functions. The present invention can be integrated into various existing flow systems or placed on entirely new flow systems to provide a layer of efficient redundancy.

In some embodiments, a fluid supply apparatus comprises a main source of hydraulic fluid, a BOP function, a primary fluid flow route from the main source of hydraulic fluid, through a primary component assisting in operating a BOP function, through a first valve, through a second valve, and then to the BOP function, and a secondary fluid flow route from the main source of hydraulic fluid, through an isolation valve rigidly attached to the BOP, through a pilot-operated valve rigidly attached to the BOP, through a hose removably connectable to an intervention panel, through the second valve, and to the BOP function, wherein the secondary fluid flow route bypasses the primary component assisting in operating the BOP function and the first valve.

In some embodiments, a remotely operated vehicle (ROV) may deploy selectable hydraulic supply to a BOP function that has lost conventional control. The shuttle valve has an outlet that is hard piped to a BOP function, an inlet connected to another shuttle valve, and a secondary inlet that is hard piped from a receiver plate. During normal flow, the shuttle is in the normal flow position and fluid enters the primary inlet and flows around the shuttle stem and out of the outlet. When backup flow is introduced into secondary inlet, the fluid forces the shuttle to the actuated position, isolating the primary inlet and allowing flow only from the secondary inlet.

In some embodiments, a BOP hydraulic control system includes a blue central control pod, a yellow central control pod, and one or more spare functions that can supply fluid from or on behalf of either pod.

Independent and/or redundant control over BOP functions reduces downtime and increases safety. The present invention is compatible with a multitude of established systems and provides inexpensive redundancy for BOP system components. In another embodiment of the invention, control over the spare function is transparently integrated into an existing multiplex control system, allowing an operator to control the spare function using the existing control system.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

As used herein, the use of the word "a" or "an" when used in conjunction with the term "comprising" (or the synonymous "having") in the claims and/or the specification may mean "one," but it is also consistent with the meaning of "one or more," "at least one," and "one or more than one." In addition, as used herein, the phrase "connected to" means joined to or placed into communication with, either directly or through intermediate components.

Figure 1:
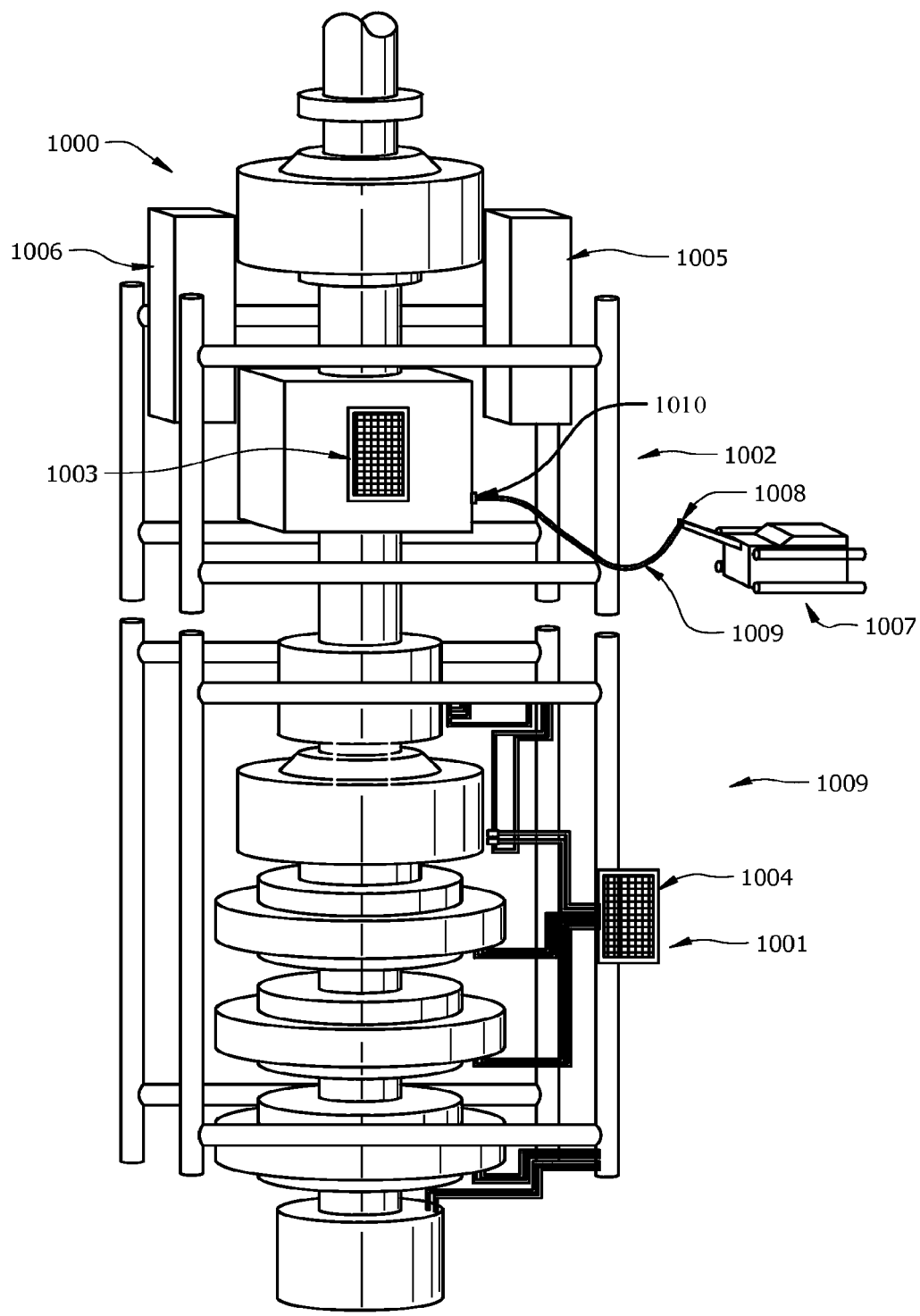
FIG. 1 is a perspective view of a BOP apparatus, including a LMRP, incorporating an embodiment of the present invention.
Figure 2:
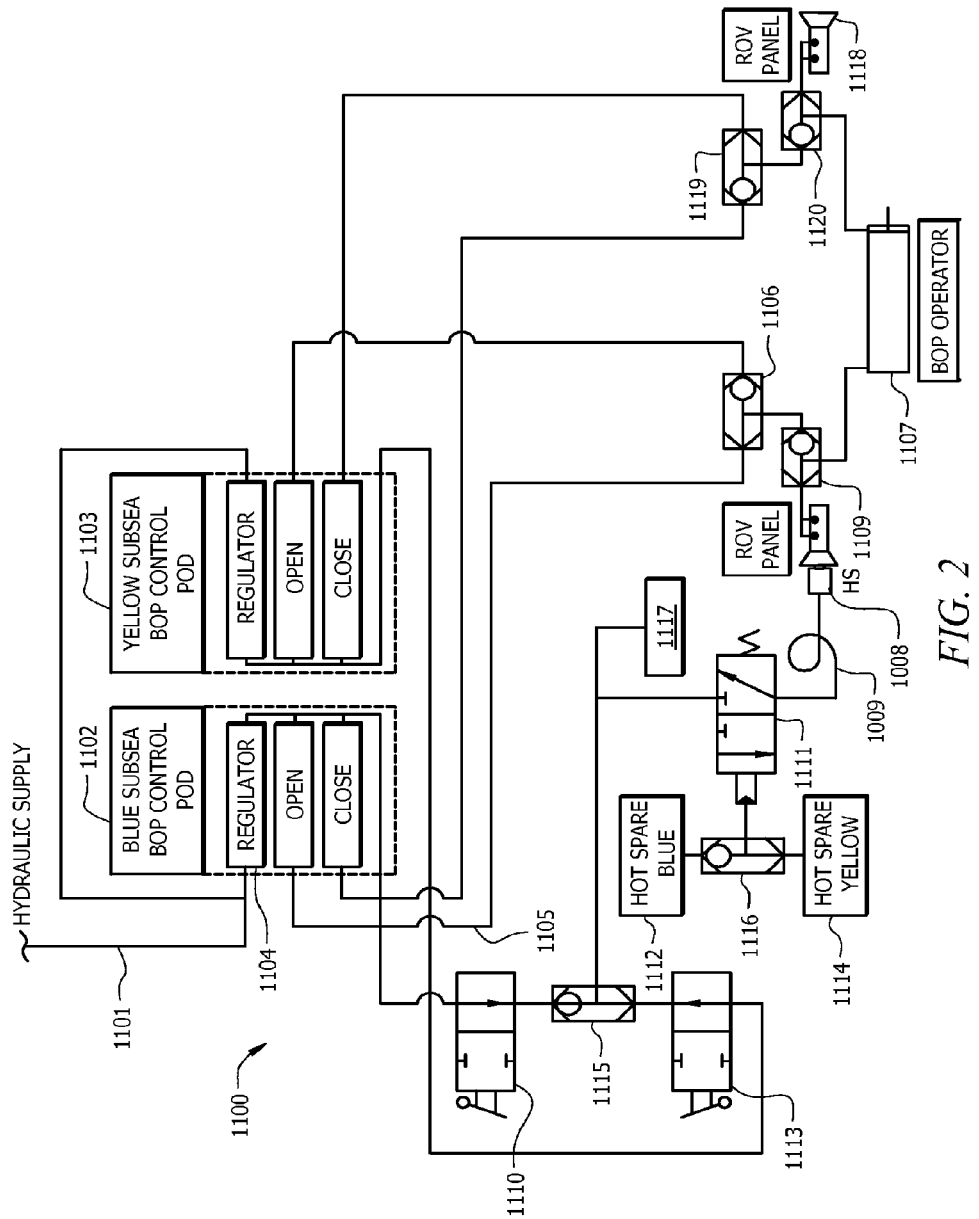
FIG. 2 is a schematic diagram of a subsea control system representing one embodiment of the present invention.

Referring to FIG. 1, one embodiment of the present invention comprises an apparatus providing operational redundancy. In the embodiment shown in FIG. 1, BOP system 1000 comprises BOP stack 1001, LMRP 1002, intervention panels 1003 and 1004, yellow pod 1005, and blue pod 1006. In typical operation, hydraulic fluid flows to a BOP function via a primary flow route that may include components such as, but not limited to, valves, pipes, hoses, seals, connections, and instrumentation. BOP control functions include, but are not limited to, the opening and closing of hydraulically operated pipe rams, annular seals, shear rams designed to cut the pipe, a series of remote operated valves to allow controlled flow of drilling fluids, a riser connector, and well re-entry equipment.

Failure or malfunction of any one of the components inside of control pod 1005 or 1006 that is not backed up according to the present invention may require stopping drilling and servicing the control pod, which costs a lot of money. When a control component in the blue or yellow control pod, or elsewhere, malfunctions, the BOP function to which the control component corresponds will not respond to normal commands (for instance, an annular will not shut). Preexisting backups include the control pods, which are hard piped to the various BOP functions, which means that if one component in control pod 1005 or 1006 fails and must be repaired, the whole control pod or the LMRP must be disconnected and the control pod's control over BOP functions cease or is limited. As used herein, "hard piped" or "hard piping" or "rigidly connected" refers to piping, components, and associated connections that are permanent or not easily removed by an ROV. This is significant because rigidly connected components are more reliable. In addition, for safety and regulatory reasons, a drilling operation cannot or will not operate with only one working control pod. Thus, a failure of one component of one pod forces a drilling operation to stop. One embodiment of the present invention overcomes this problem in subsea drilling by providing selectable backup control for many BOP functions via spare functions integrated into the BOP.

In the event of a failure in the primary flow route, a backup flow route includes a spare function 1010, which can be any back-up or non-critical function that is rigidly connected to the BOP. The rigid, non-removable nature of spare function 1010 eliminates failure points and increases reliability. From spare function 1010, the fluid flows through components including hose 1009 and into an intervention panel, which is hard piped to the failed function as described below.

As shown, ROV 1007 is connecting hose 1009, including hot stab 1008 to an intervention panel 1004. Once hot stab 1008 is connected, regulated manifold pressurized hydraulic fluid is routed to the function corresponding to the stab location, allowing operational redundancy and avoiding downtime. ROV 1007 that deploys hose 1009 can connect it or disconnect it from intervention panel 1003 or 1004. ROV 1007 may be operated from the surface by a human operator, or it may be preprogrammed to perform specific connections or disconnections based on input from a multiplex control system.

Hose 1009 connects to the BOP function via a temporary connection to intervention plates 1003 or 1004, which temporary connections comprise commercially available stab connections, such as those having an external self-aligning hydraulic link that extends into a connection port and mates with its hydraulic circuit. Generally, a stab connection comprises a receiver or female portions and a stab or male portion, and either portion may be referred to generically as a stab connection.

In some embodiments, an electronic multiplex control system ("MUX") and an operator on the surface control and/or monitor BOP functions and hydraulic supply. In a simple sense, the MUX allows an operator to control BOP functions by the push of buttons or the like. For example the operator closes an annular by pressing a button or inputting an electronic command to signal the hydraulic system to close the annular. In some embodiments, the present invention is integrated into an existing multiplex system such that the initiation of backup hydraulic supply can be commanded by the push of a button. In addition, software can allow the switch between normal flow and backup flow to be transparent in that the operator pushes the same button to control a particular function whether normal or backup flow used.

FIG. 11 shows an embodiment of the invention including control system 1100. In a standard operation, pressurized hydraulic fluid flows from surface via the riser in line 1101 through either control pod 1102 or 1103. Assuming flow through pod 1102 to control a BOP "open" function, the fluid flows through regulator 1104, through various equipment, then through line 1105 and valve 1106, to function 1107.

The embodiment of the present invention shown adds a layer of operational redundancy by providing an integrated source of hydraulic fluid from a spare function rigidly attached to the BOP via hot stab 1008, piping to an additional valve 1109, and piping from valve 1109 to a function. For example, in the event of a malfunction of the primary hydraulic route, hot stab 1008 could be connected to the intervention panel so that the fluid forces valve 1109 to shift and allows fluid to flow to BOP function 1107 via associated hard piping. Valves 1106 and 1109 can be a variety of known valves, such as a shuttle valve.

The backup supply route preferably begins downstream of regulator 1104 and leads to valve 1110 rigidly attached to the BOP, which can be an isolation valve operable by an ROV, or another suitable valve to prevent flow through the backup route until needed. Flow through valve 1110 leads to valve 1111, which leads to hose 1009. Pilot hydraulic signals from spare outlets (or non-critical functions if no spares exist) such as hot spare 1112 can act as a hot spare and can be used to shift valve 1111 to supply regulated fluid through hose 1009 to stab 1008. In one embodiment, valve 1111 is a LMRP-mounted spare sub-plate mounted (SPM) valve piloted by a hot stab solenoid. Because all key components are rigidly fixed to the BOP apparatus, point failures are eliminated and a reliable source of operational redundancy is provided.

Thus, when a failure occurs, the ROV can route the flying lead hydraulic hot stab hose 1009 leading from spare source 1010 to the appropriate ROV input on the intervention panel 1003 or 1004 located on the LMRP or BOP stack. The hot stab now supplies the hydraulic output in place of the output from the failed pod circuit. The spare function on the BOP control panel on surface is then labeled with the function it now controls. Thus, full operational redundancy is provided, allowing continued operation of all functions.

As shown in FIG. 11, the system can be provided with redundancy for both "blue" and "yellow" pods 1102 and 1103. Thus, valve 1113 complements valve 1110 and hot spare 1114 complements spare 1112; and, in both cases, a shuttle valve (1115 and 1116, respectively) or other suitable valve moderates flow as between the two complementary valves. Although not shown in detail, an additional hot spare package 1117, including hot spares and a valve complementary to valve 1111, can branch from the line downstream of valves 1110 and 1113 to operate second hot stab that would enter an intervention panel at stab location 1118, which has associated with it valve 1119 and 1120, which are similar to valves 1106 and 1109, respectively. Additional hot spare packages can be added, each of which can be separately controlled from the surface.

For each function provided with operational redundancy via the intervention panel, a valve like valves 1109 and 1120 (and associated piping) will be utilized. Each valve can be connected to the intervention panel using ½" outer diameter piping, although other piping can be used. In one embodiment, the intervention panel and receptacles are constructed to API 17D specifications, though other configurations are within the scope of the invention.

There does not, however, need to be a hot spare package for each BOP/LMRP function to be provided with redundancy, and the number of hot spare packages can be as few as one. This is because it is not generally the case that several BOP functions fail simultaneously, and thus one or two hot spare packages will often suffice.

Additionally, the intervention panels and associated valves and tubing or piping (e.g., valves 1109 and 1120) permit actuation of BOP functions when the BOP stack is on the surface, facilitating maintenance without having to make, break, or manipulate existing connections, which can lead to degradation and failure. An operator can simply stab a connection onto the appropriate receptor on the intervention panel and then test or otherwise perform maintenance on the associated function.

Thus, the system increases redundancy and eliminates intrusive maintenance activities. The modification involves the installation of a minimal amount of hardware on the subsea BOP stack to allow continued operation (via additional BOP control redundancy) even after failure of a major BOP control function. While any number of functions can be provided with redundancy, the best candidates for such redundancy can be identified by an analysis of potential single-point failures. Additionally, the added hardware will allow for actuation of BOP functions when the BOP stack is on the surface, facilitating maintenance without having to interrupt existing connections. This additional feature facilitates maintenance on the surface and reduces the likelihood of experiencing a maintenance-induced failure.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A BOP fluid supply apparatus, comprising:
 a main source of hydraulic fluid;
 a BOP function;
 a primary fluid flow route from the main source of hydraulic fluid, through a primary component assisting in operating the BOP function, through a first valve, through a second valve, and then to the BOP function; and
 a secondary fluid flow route from the main source of hydraulic fluid, through an isolation valve rigidly fixed to the BOP, through a pilot-operated hot spare valve rigidly fixed to the BOP, through a hose removably connected to an intervention panel, through the second valve, and to the BOP function, wherein the secondary fluid flow route bypasses the primary component assisting in operating the BOP function and the first valve and provides hydraulic fluid to operate the BOP function;
 wherein the primary fluid flow route comprises a blue pod primary fluid flow route and the secondary fluid flow route comprises a blue pod secondary fluid flow route; and
 further comprising a yellow pod primary fluid flow route from the main source of hydraulic fluid, through a yellow pod primary component assisting in operating the BOP function, through the first valve, through the second valve, and then to the BOP function; and
 a yellow pod secondary fluid flow route from the main source of hydraulic fluid, through a yellow pod isolation valve rigidly fixed to the BOP, through a shuttle valve connected to the blue pod isolation valve, through the pilot-operated valve, through the hose connected to the intervention panel, through the second valve, and to the BOP function, wherein the yellow pod secondary fluid flow route bypasses the yellow pod primary component assisting in operating the BOP function and the first valve.

2. The apparatus of claim 1, wherein the primary and secondary fluid flow routes pass through a regulator.

3. The apparatus of claim 1, wherein the secondary fluid flow route allows operational redundancy of the BOP function.

4. The apparatus of claim 1, wherein the pilot-operated valve is controllable at a surface station and obtains hydraulic fluid for pilot operation from a hot spare source on the BOP.

5. The apparatus of claim 4, further comprising an electronic multiplex system at the surface station that can be programmed to control the primary and secondary fluid flow routes.

6. The apparatus of claim 1, wherein the intervention panel comprises a plurality of connection ports leading to a corresponding plurality of BOP functions.

7. The apparatus of claim 1, wherein the first and second valves are shuttle valves and the pilot-operated valve is an SPM solenoid-operated valve.

8. The apparatus of claim 1, wherein the isolation valve can be operated by an ROV.

9. The apparatus of claim 1, wherein the primary fluid flow route enters the second valve through a primary inlet and the secondary fluid flow route enters the second valve through a secondary inlet.

* * * * *